United States Patent [19]

Benson, Jr.

[11] 3,724,181
[45] Apr. 3, 1973

[54] PROCESS FOR SEPARATING PARTICLES FROM AEROSOLS
[75] Inventor: Harvey S. Benson, Jr., Mico, Tex.
[73] Assignee: Envirco Corporation, San Antonio, Tex.
[22] Filed: June 11, 1971
[21] Appl. No.: 152,208

[52] U.S. Cl. .............................. 55/432, 55/1, 55/459
[51] Int. Cl. ............................................. B01d 45/12
[58] Field of Search....55/342, 1, 337, 400, 406, 407, 55/432, 433, 452, 454, 459, 460; 209/144, 143; 210/512

[56] References Cited

UNITED STATES PATENTS 1,836,758  12/1931  Knapp........................................55/452

Primary Examiner—Bernard Nozick
Attorney—Bertram H. Mann et al.

[57] ABSTRACT

Apparatus for the removal of liquid or solid particles from an aerosol flowing through a conduit. A feature of the method and means for this invention is the provision of (a) a deflector baffle member arranged to divert the flow of the gaseous stream of said aerosol from a wall of the conduit and to cause the stream to pass over a lip of the deflector member whereby an area of turbulence is formed downstream from the deflector member, and (b) a passage provided through the wall of the conduit adjacent said lip and downstream therefrom. It is a discovery of this invention that highly efficient particle separation is achieved by the formation of such turbulent area, or vortex, behind the lip wherein particles are momentarily trapped and then caused to move through the passage into a collection chamber.

**4 Claims, 4 Draw

HARVEY S. BENSON, JR.
INVENTOR.

BY
Delmar L. Sroufe
ATTORNEY

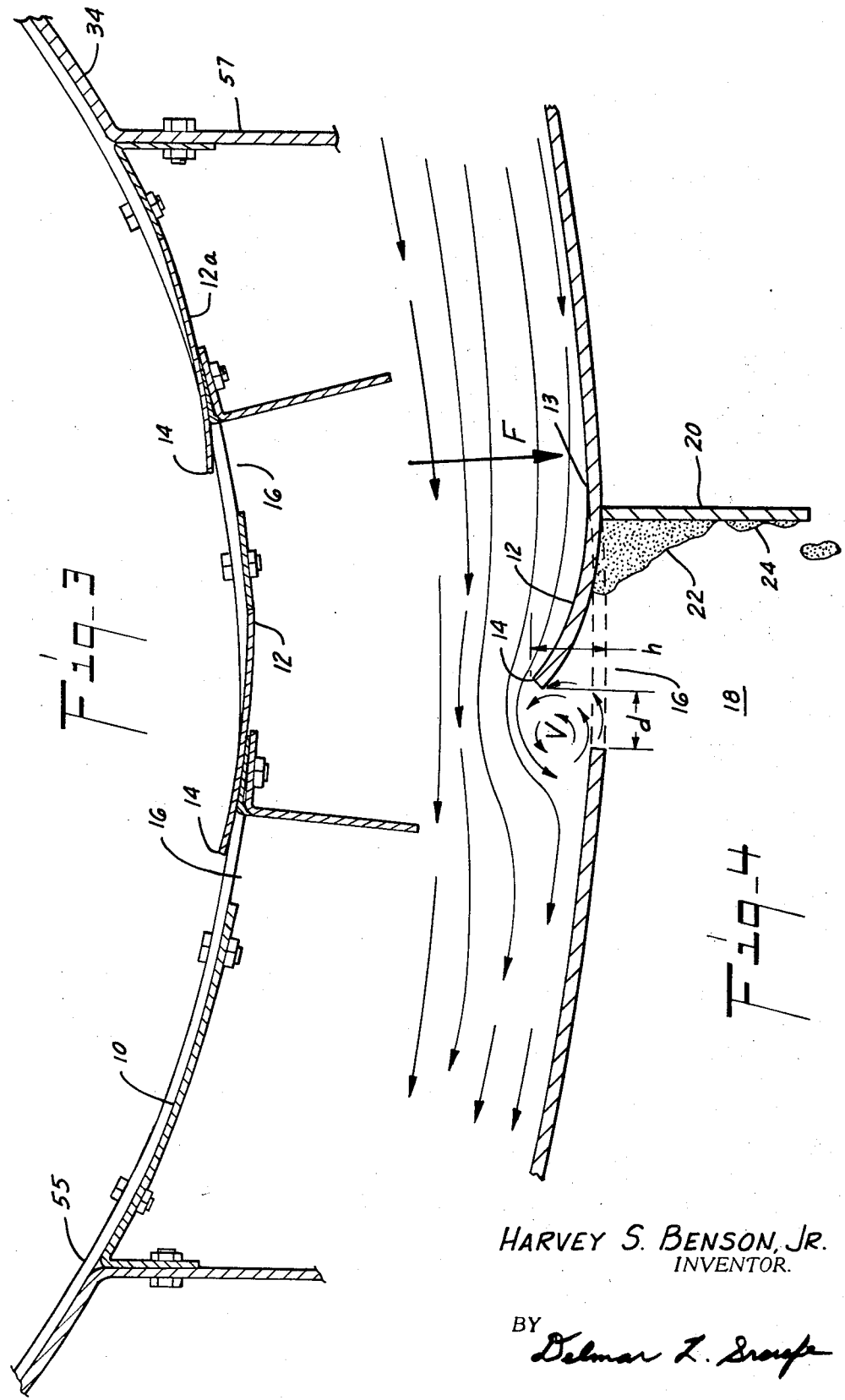

PROCESS FOR SEPARATING PARTICLES FROM AEROSOLS

BACKGROUND OF THE INVENTION

1. Field of the Invention

This invention relates to the removal of liquid or solid particles from an aerosol stream by utilizing continuous separator means. The apparatus may be used for separation of various dusts, powders and mists.

2. Description of Prior Art

Numerous types of particle separators and collectors are available. For various applications such collectors may utilize centrifugal particle acceleration produced by powered rotating elements; centrifugal acceleration by directing gaseous streams powered by pressure or suction sources tangentially into a scroll; or various filter or grid devices. Other means of concentrating the particle content in a portion of a gaseous stream may be used such as electrostatic forces or even gravity.

Dynamic separators, cyclones, and other machines of the inertial separator class have the common characteristic that as the first step of the separation sequence the particles to be separated move under the influence of centrifugal acceleration and thereby produce a zone of "dirty" gas in which the particle concentration is much greater than in the remaining "clean" gas that becomes a part of the discharge from the machine. In any event, this "clean" exhaust gas is clean to the extent that the separator has been able to concentrate the entrained particles in dirty gas layers and it should be recognized that for most machines this first action represents a much greater separation efficiency than the final or overall machine collection efficiency because of the difficulty of removing the suspended particles from the dirty gas portion of the aerosol.

Several techniques of varied efficiency are used to clean the dirty gas which is itself a considerable fraction of the total flow through most continuous flow separator machines, and each technique has its own advantages and disadvantages. For example, impingement upon walls, baffles, ribs or vanes (wet or dry, moving or fixed) to produce enough surface accumulation so that collected material will flow into a hopper are used in cyclones and in grid or baffled separators of various types. For example see Hoffstrom U.S. Pat. No. 3,140,937 for a grid separator; Baldwin U.S. Pat. No. 1,292,561 for a dynamic rotary separator in which particles are caused to impinge upon a fixed screen and thereafter upon the outer casing of the machine; and Fletcher U.S. Pat. No. 505,977 in which ribs are provided on the walls of a cyclone separator to cause particles to collect in eddies behind the ribs and wherein the ribs function to protect the accumulated particles from the gaseous stream and also to serve as channels for gravity settling of the particles.

The efficiency of each such baffle, vane or grid is greatly affected by particle size, particle concentration or aerosol loading, and by the relative velocity of the impingement surface to the particle-laden gas stream. As an alternative to these arrangements, a second class of devices generally referred to as skimmers is employed to literally skim the layer of dirty gas off the flowing stream by providing a blade that divides the stream as nearly as possible into clean and dirty fractions. Typical skimmer arrangements are illustrated in Erb U.S. Pat. No. 2,854,093 (see FIG. 6), and Smith Pat. No. 390,100 (see FIG. 3 at numeral 6).

Although the efficiency of collection of various dusts and powders is dependent upon several factors known in the art such as particle size and density, it is believed that an efficient prior art separator machine of the inertial class can achieve about 85 percent collection of a hard wheat flour from an aerosol. Such hard wheat flour typically has over 50 percent of the particles less than 20 microns in size and 13 percent below 5 microns. The specific gravity is about 0.75.

SUMMARY OF THE INVENTION

A primary object of this invention is to provide continuous particle removal apparatus with improved efficiency in the collection of particles from aerosol streams.

A further object of this invention is to provide novel apparatus for improved efficiency in the removal of particulate matter from aerosols by power driven rotary separator devices.

Other objects and advantages of this invention will be apparent from the following description of the present invention, the drawings and appended claims.

The foregoing objects are achieved in the practice of the present invention by providing improved means for the separation and removal of particles from a gaseous fluid stream. Preferably the collection of particles is achieved by removal of such particles from a so-called dirty gas zone wherein the particles are highly concentrated. It is necessary in the practice of this invention that the gaseous stream of the aerosol be caused to flow adjacent a conduit wall.

It has been found that when an aerosol comprising such a gaseous stream containing suspended particles is conveyed through a conduit, an improved means of removing the particles from the gaseous stream may be provided by the combination of a deflector baffle (which may be a curved member made integral with a portion of the wall itself) and a passage through the conduit wall downstream from the baffle. The lip of the deflector is spaced from the projected wall surface. The removal action is novel in that, as the gas stream flows past the lip of the deflector, the stream is caused to move away from the wall and an eddy or vortex is formed in the opening behind the lip of the deflector where flow separation has taken place. It has been observed that the resulting turbulent zone contains a region of recirculation, or a vortex. This zone is an efficient trap for any particles that come within its influence.

The opening for the passage of the trapped particles from the conduit is provided downstream from the lip of the deflector so that particles are conveyed by the vortex through the passage. A portion of the particles may be deposited on the underside of the deflector member from which they dislodge and fall into the collection chamber and a substantial portion of the particles is conveyed directly through the passageway into the collection chamber where they may be deposited upon the sidewalls thereof or they may precipitate directly into the quiet zone of the collection chamber. This combination of elements may be aptly described as a "flow spoiler with a discharge port (or passage)." In the further discussion of this invention, the operation of this apparatus may be referred to as the "flow spoiler effect."

Although particle separation by means of the flow spoiler effect may be achieved to some extent by the elements of the spoiler and collection passage with any moving aerosol stream, it is particularly efficient in the removal of particles from the concentrated particle zone or dirty gas zone of a dynamic inertial aerosol separator. Such machines are known in the art, and it is presently preferred to use machines of the type employing a power driven rotor with radial fins to impart high velocity rotary motion to the gaseous stream in the conduit comprising the annulus between the rotor and the housing of such machine. The rotary flow of the aerosol stream in the dynamic separator of this type imposes centrifugal force upon the suspended particles whereby they are concentrated in a zone or stream adjacent the housing wall. Test data on machines of this class indicate that the collection efficiency with the spoiler effect is typically 10 percent greater than that achieved by use of a skimmer and that a non-obvious advantage to the use of the spoiler is the fact that the collection chamber pressure is typically about 2 inches W.G. (water gauge) lower than the pressure in the conduit section of the same machine whereas with a skimmer system the collection chamber pressure is higher than the conduit section pressure. This lower pressure provides a definite advantage because it lowers the requirements of the dump valve. Such valves are rated and priced, among other things, according to operating pressure differential.

BRIEF DESCRIPTION OF THE DRAWINGS

Turning now to the drawings

FIG. 3 is an enlarged sectional view of the flow spoiler element of the present invention; and FIG. 4 is a diagrammatic somewhat schematic view of the separator elements of the present invention indicating the theorized operation thereof.

DESCRIPTION OF THE PREFERRED EMBODIMENTS

Figure 1:
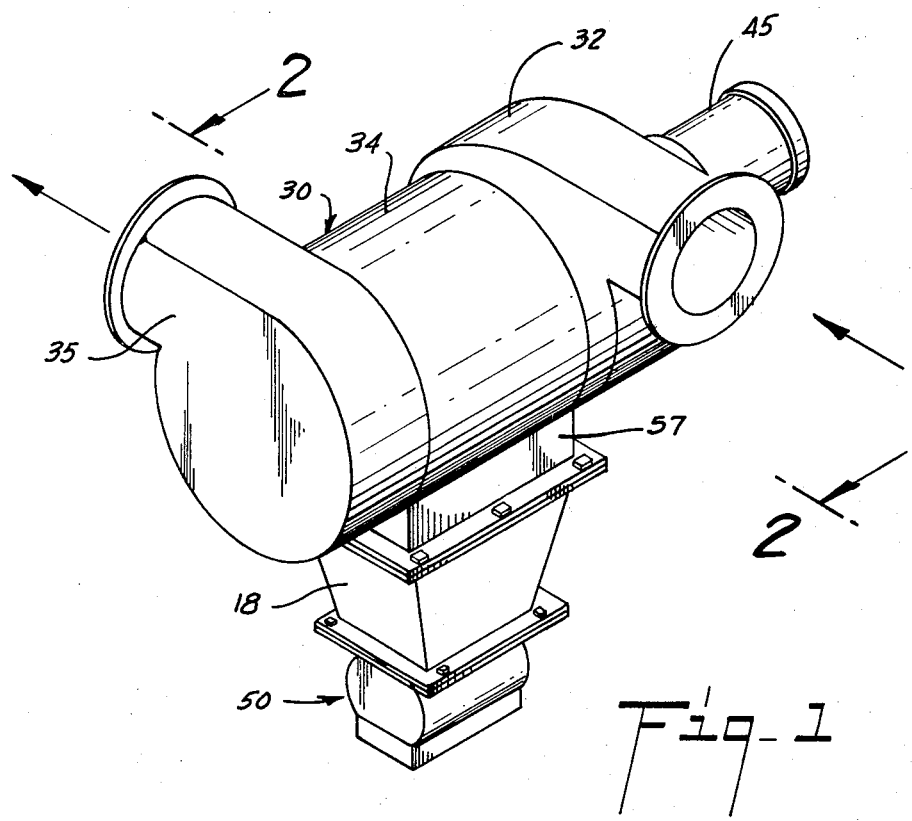
FIG. 1 is an axonometric projection of a dynamic inertial separator embodying the present invention.

The present invention generally requires means for inducing a flow of an aerosol through a conduit, and it involves separating the liquid or solid particles from the gaseous portion of the aerosol by inducing one or more zones of turbulence wherein the gas particles are momentarily trapped in a vortex which is positioned adjacent or within a passage so that the precipitation of particles therefrom will cause them to be collected in a chamber outside the conduit.

The functioning of the flow spoiler and discharge passage can best be described by reference to the schematic illustration shown in FIG. 4. For most presently contemplated uses of the spoiler, the conduit wall 10 will have a circular configuration and be a part of a centrifugal separator device. The arrows show the direction of flow of the gaseous stream and by imposing an accelleration upon the particles by centrifugal force, electrostatic force or other means the particles are caused to concentrate in the portion of the aerosol stream adjacent wall 10. The deflector baffle 12 is preferably made integral with wall 10 and joined thereto at 13. It terminates with lip 14 which is spaced a distance indicated as $h$ from the projection of the wall 10. The lip is upstream of and adjacent to a discharge passage of $d$ width which connects the conduit with collection chamber 18. As the flow of the gaseous stream passes in the direction of the arrows over lip 14 of deflector 12, abrupt pressure variations plus shear forces cause an eddy or vortex indicated around the letter V to form in the zone of the discharge passage 16. This "trailing vortex" or "suction eddy" has been found to be a very efficient means for trapping and momentarily holding small particles.

Particles released from the vortex tend to be deposited and accumulate on the underside of deflector 12 from which they break loose and fall into the collection chamber 18. It has further been found that the vortex stability and efficiency of deposit of particulate material from the vortex V can be substantially enhanced by the addition of a curtain 20 disposed in the collection chamber on the upstream side of the discharge passage 16. The exact positioning of curtain 20 is not presently believed to be critical, and it may be caused to depend from either the deflector 12 or wall 10 adjacent to the opening 16. The precise functioning of curtain 20 is not fully understood but it has been found empirically that it improves the rate of deposit of particulate material in areas such as 22 and 24 and further to substantially increase the proportional amount of particulate material collected from the aerosol.

As previously indicated, the present invention has particular utility in embodiments which include inertial separator elements, and more particularly such separators of the type having a rotatable element in a housing and an annular conduit for the gaseous material located between the rotatable element, or rotor, and the housing. The rotor preferably has a plurality of radially extending blades or vanes to impart rotary motion to the gaseous stream and suspended particles flowing through the annular conduit.

Figure 2:
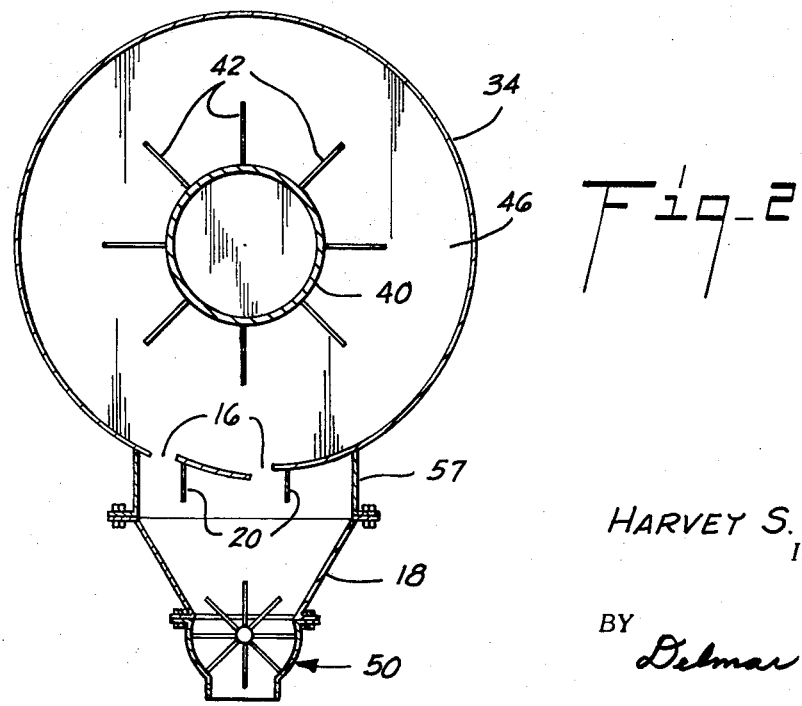
FIG. 2 is a sectional view of the separator of FIG. 1 taken along lines 2—2.

By way of further illustration of the invention, a preferred embodiment thereof as illustrated in FIGS. 1–3 will be discussed hereinafter.

The power driven, or dynamic, rotary separator of FIGS. 1–3 comprises generally an aerosol inlet scroll 32, cylindrical housing 34, gaseous outlet scroll 35 and particle collection chamber 18. The rotating element comprises a drum 40 having radially extending fins 42 affixed thereto. The rotary element 40 is driven by suitable power means such as electric motor 45 whereby rotary motion is imposed upon the aerosol stream flowing through the annular conduit 46 between the rotor drum 40 and the cylindrical housing 34.

The passage, or port, 16 connects the conduit 46 with the collection chamber 18 wherein accumulated particles are preferably discharged through a pressure-retaining discharge valve, such as rotary valve 50.

In the detailed illustration of FIG. 3, construction elements of the assembly of the flow spoiler unit of the present invention are shown. In this illustration the conduit wall 10 which is formed in part by cylindrical housing 34 is attached to an end flange 55 to which are also affixed the deflector baffles 12 and 12a. The upstream baffle 12a is further attached to the sidewall 57 which is an upper portion of the wall of collection chamber 18. This illustration shows the preferred embodiment of the deflector members wherein the upstream portion thereof begins as a continuation of the conduit wall with a gradual ramp-like curve directed away from projected plane of the interior cylindrical wall 10. Thus the lip 14 is spaced radially inwardly a distance *h* (FIG. 4) from the projected curved plane of the interior wall 10.

In the operation of the device illustrated in FIGS. 1–3, the rotating drum 40 together with the flow of the aerosol through scroll 32 produces a rotating gaseous stream which proceeds around the annular conduit 46. When the aerosol—Comprising a gaseous stream together with entrained particles—is subjected to high velocity rotation in conduit 46 such a gaseous stream together with the entrained particles are subjected to centrifugal acceleration in the direction indicated by the force F in FIG. 4. In response to this force F the entrained particles tend to concentrate in the portion of the conduit adjacent wall 10 with the degree of concentration being dependent upon the magnitude of the force, the viscosity of the gaseous fluid, particle size, density and shape, and the length of time allowed for the force to act. As the portion of the gas stream adjacent wall 10 of the conduit 46 passes over the deflector baffle 12, it is caused to move inwardly toward the axis of the machine and then over the passage 16. The eddy or vortex V formed in the opening behind lip 14 serves as an efficient trap for particles coming within its influence. Such particles are momentarily trapped by the vortex from which they are ultimately released passing through the passage 16 to be either deposited upon the undersurface of deflector baffle 12, or upon curtain 20, or they may be precipitated directly into collection chamber 18.

Actual tests have been conducted employing a centrifugal separator similar to that illustrated in FIGS. 1–3 with a designed capacity for handling 2,000 cu. ft./minute of aerosol. These tests of the apparatus have been conducted upon air-borne particulates of various materials, including water mists, finely divided barite, and hard wheat flour.

It has been observed that in the removal of particulate matter by the matter by the practice of the present invention, the high efficiency is achieved in large measure by avoiding high pressures, turbulence and reentrainment of particles in the collection chamber. When a skimmer blade system such as illustrated in Erb U.S. Pat. No. 2,854,093 and Smith U.S. Pat. No. 390,100 is employed it is found that the diversion of the stream of dirty gas or air directly into the collection chamber invariably results in increased pressure and turbulence in the collection chamber and this turbulence causes reentrainment of some of the particles deposited in the collection chamber or adhering to the sidewalls thereof. Such collection losses are greatly reduced or eliminated by the use of the present invention.

Specific apparatus has been used to describe the present invention; however, it should be understood that the scope of the invention and the claims directed thereto embrace the use of other means for concentrating particulate matter in a gaseous stream, such as electrostatic means, and that the flow spoiler and collection passage may be incorporated in other separator devices such as, for example, cyclones wherein the centrifugal force in resultant concentration of particles is achieved by high velocity tangential flow into the device. Further, although the apparatus illustrated in FIGS. 1–3 employs two flow spoilers with collection passages, the number of such units may be varied without departing from the present invention.

I claim:

1. Means for separating particles from a moving aerosol wherein particles are suspended in a gaseous fluid stream, said means comprising:

a. A centrifugal separator device having a circular cross section;

b. A conduit for the gaseous stream, said conduit being within said centrifugal separator device and said conduit including an outer wall having an imperforate portion with a circular configuration;

c. A chamber adjacent said conduit;

d. A passage connecting said conduit with said chamber;

e. A tangential inlet upstream of said passage, said inlet being alligned to conduct said gaseous stream tangentially into contact with said imperforate wall portion of said circular conduit;

f. Flow deflecting means in said conduit adjacent to and extending downstream from said imperforate wall portion to contact said gaseous flow, said deflecting means including a baffle member disposed inwardly away from said outer wall into the conduit and said baffle member further being located adjacent to and up-stream of the mouth of said passage to divert said gaseous stream away from said imperforate wall portion and over said passage to cause a trailing vortex down-stream of a lip of the baffle member thereby (i) to cause suspended particles to be trapped in said vortex and (ii) to cause said particles to be conveyed through said passage into said chamber and a gas outlet from the conduit.

2. The means of claim 1 in which said flow deflecting means comprises a baffle member, one edge of said baffle member being connected to said wall so that at the line of connection one side of said baffle member is mergent with the inside of said conduit wall, and said baffle being curved away from the curve of said wall so that the lip of said baffle is spaced from the projected arcuate plane of the inner side of said wall.

3. The means of claim 1 in which said chamber is closed and said chamber is connected to a pressure retaining discharge valve.

4. The means of claim 1 together with a curtain member disposed in said chamber adjacent to said passage and on the side thereof adjacent to said deflector lip.

* * * * *